United States Patent
Chen

(10) Patent No.: US 7,657,121 B2
(45) Date of Patent: Feb. 2, 2010

(54) METHOD FOR SIMULTANEOUSLY CAPTURING IMAGES OF MULTIPLE AREAS AND IMAGE PROCESSING DEVICE

(75) Inventor: Shing-Chia Chen, Kaohsiung (TW)

(73) Assignee: Avision Inc. (TW)

( * ) Notice: Subject to any disclaimer, the term of this patent is extended or adjusted under 35 U.S.C. 154(b) by 734 days.

(21) Appl. No.: 11/505,862

(22) Filed: Aug. 18, 2006

(65) Prior Publication Data

US 2007/0041057 A1 Feb. 22, 2007

(30) Foreign Application Priority Data

Aug. 22, 2005 (TW) ............... 94128650 A

(51) Int. Cl.
H04N 7/00 (2006.01)
G06K 9/32 (2006.01)
H04N 1/00 (2006.01)

(52) U.S. Cl. ............. 382/298; 348/139; 348/24; 358/408

(58) Field of Classification Search ......... 382/128, 382/115, 131, 154, 216, 282, 298, 312; 378/9.4, 378/21, 28, 38, 45; 348/218.1, 14.04, 14.14, 348/24, 36, 139, 72; 358/505, 514, 400, 358/408, 450, 452, 453, 474
See application file for complete search history.

(56) References Cited

U.S. PATENT DOCUMENTS

| | | | |
|---|---|---|---|
| 6,760,399 B2 * | 7/2004 | Malamud | 378/9 |
| 7,339,614 B2 * | 3/2008 | Gruber et al. | 348/218.1 |
| 2002/0163582 A1 * | 11/2002 | Gruber et al. | 348/218.1 |
| 2003/0108146 A1 * | 6/2003 | Malamud | 378/19 |
| 2006/0215038 A1 * | 9/2006 | Gruber et al. | 348/218.1 |
| 2006/0269342 A1 * | 11/2006 | Yoshida et al. | 400/62 |
| 2007/0092245 A1 * | 4/2007 | Bazakos et al. | 396/427 |

* cited by examiner

*Primary Examiner*—Jerome Grant, II

(57) ABSTRACT

A method for simultaneously capturing images of multiple areas is applied to an image processing device. The method includes scanning a document and obtaining a preview image of the document; providing N scan windows for selecting N to-be-scanned areas from the preview image, wherein N is an integer; setting N scan resolutions respectively for the N scan windows; scanning the document; and outputting N scan images corresponding to the N scan windows according to N frequencies of a timing signal corresponding to the N scan resolutions.

9 Claims, 5 Drawing Sheets

METHOD FOR SIMULTANEOUSLY CAPTURING IMAGES OF MULTIPLE AREAS AND IMAGE PROCESSING DEVICE

This application claims the benefit of Taiwan application Serial No. 94128650, filed Aug. 22, 2005, the subject matter of which is incorporated herein by reference.

BACKGROUND OF THE INVENTION

1. Field of the Invention

The invention relates in general to an image scan method and device, and more particularly to a method and device for simultaneously capturing images of multiple areas.

2. Description of the Related Art

Scanners are a kind of very popular image capturing and outputting device. Generally speaking, the scanner projects light onto a to-be-scanned document and receives the light reflected from the document with a photo-sensing device so as to capture a scan image of the to-be-scanned document. The scan image is then transmitted to a computer coupled to the scanner, or thus being processed and stored in a memory device.

Referring to FIG. 1, a flow chart of a scan method of a conventional scanner is shown. First, in step 100, start a scan program. Next, in step 110, obtain a preview image of the to-be-scanned document. In step 120, adjust image setting parameters, such as brightness, contrast, resolution of the areas to be scanned. Following that, in step 130, adjust the size and position of a scan window according to the image capturing range decided by the user. Finally, in step 140, perform a scan procedure according to the settings in the steps 120 and 130, that is, scan the document to obtain the scan image according to the selected scan window and image setting parameters.

In a conventional scan method, only one scan window is provided for the user to determine the image area to be captured. Therefore, when the user selects to scan a number of image areas, such as a first area and a second area, of the preview image, he/she needs to scan the first area and the second area in two scanning procedures and adjust the image setting parameters each time.

Or the user could adjust the size and position of the scan window and select both the first area and second area in one scan window in order to obtain a scan image of a region including the first area and second area. Following that, the scan image is edited into an image of the first area and an image of the second area by using an image editing software, such as PhotoShop. Consequently, when the user would like to obtain images of multiple areas, the scan task becomes very complicated: the scan operation or the post-editing procedure needs to be repeated many times, thereby wasting time and increasing scan cost.

SUMMARY OF THE INVENTION

It is therefore an object of the invention to provide a method for simultaneously capturing images of multiple areas and image processing device. N scan windows are provided for selecting N scan areas of a to-be-scanned document wherein N is an integer. N scan images corresponding to N scan windows are generated in one single scan operation. Therefore, the user can just generate scan images of multiple areas, which have even different resolutions, in one scan operation.

The invention achieves the above-identified object by providing a method for simultaneously capturing multiple images for an image processing device. The method includes scanning a document and obtaining a preview image of the document; providing N scan windows for selecting N to-be-scanned areas from the preview image, wherein N is an integer; setting N scan resolutions for the N scan windows respectively; scanning the document; and outputting N scan images corresponding to the N scan windows according to N frequencies of a timing signal corresponding to the N scan resolutions.

The invention achieves the above-identified object by providing an image processing device for simultaneously capturing images of a plurality of areas and providing a plurality of scan windows. The image processing device includes a scan module, an operation unit and a control unit. The scan module is for scanning a document and generating a preview image of the document. The operation unit is for selecting a plurality of to-be-scanned areas from the preview image by means of adjusting the positions and sizes of the scan windows and setting a scan resolution for each of the scan windows. The control unit, electrically coupled to the scan module and the operation unit, is for controlling the scan module to perform a formal scan procedure on the document according to the scan resolutions and for outputting a timing signal having a plurality of frequencies. The scan module generates a plurality of image data corresponding to the areas specified by the scan windows according to the frequencies of the timing signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
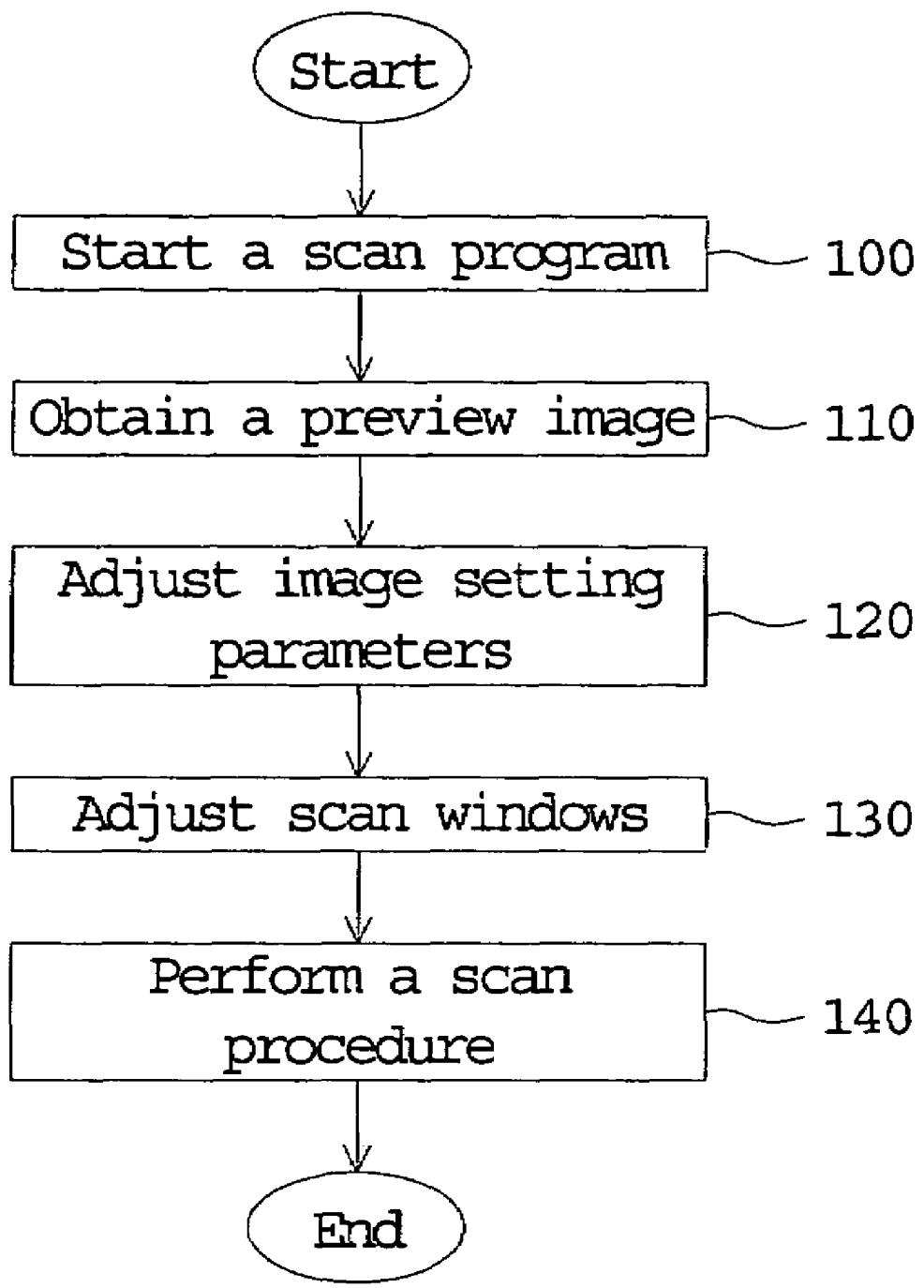
FIG. 1 is a flow chart of a scan method of a conventional scanner.
Figure 2A:
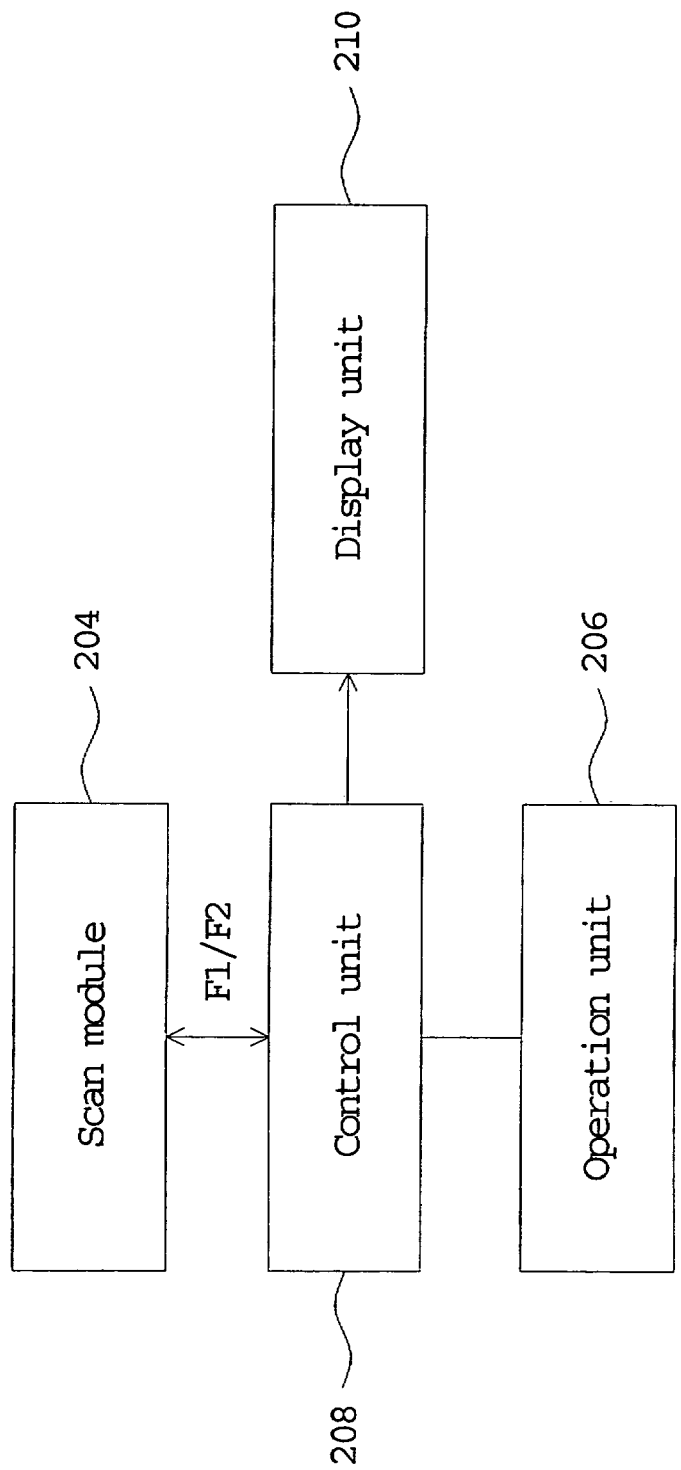
FIG. 2A is a block diagram of an image processing device.

Referring to FIG. 2A, a block diagram of an image processing device is shown. The image processing device 202 is for simultaneously capturing images by using a number of scan windows SW (not shown in the figure). The image processing device 202 includes a scan module 204, an operation unit 206, a control unit 208 and a display unit 210. The scan module 204 is for scanning a document and generating a preview image of the document. The display unit 210 is for displaying the preview image. The operation unit 206, providing the scan windows SW, is for selecting a number of to-be-scanned areas from the preview image and setting a scan resolution for each to-be-scanned area. The scan windows SW are used to draw a frame around the to-be-scanned areas. Each of the scan windows SW respectively corresponds to a to-be-scanned area. The control unit 208 is electrically coupled to the above-mentioned scan module 204, operation unit 206 and display unit 210. The control unit 208 controls the scan module 204 to perform a formal scan procedure on the document according to the scan resolution set for each scan window SW and outputs a CCD timing signal of multiple frequencies. According to the frequencies of the CCD timing signal, the scan module 204 generates a number of image data corresponding to the areas specified by the scan windows SW.

The image processing device 202, for example, is a scanner, a combination of a scanner and a personal computer (PC), or a combination of a multifunction peripheral (MFP) and a PC. When the image processing device 202 is a combination of a scanner and a PC, or a combination of a MFP and a PC, the above-mentioned display unit 208 can be a displaying monitor of the PC, such as a liquid crystal display (LCD), and the operation unit 206 includes at least a user interface coupled to the PC and an operational interface coupled to the scanner or multifunction peripheral. The PC (not shown in FIG. 2A) is, for example, a desktop computer, a notebook or a barebone system. In the embodiment, the type of the PC is not limited as long as the PC can be used to control the image processing device 202.

Figure 2B:
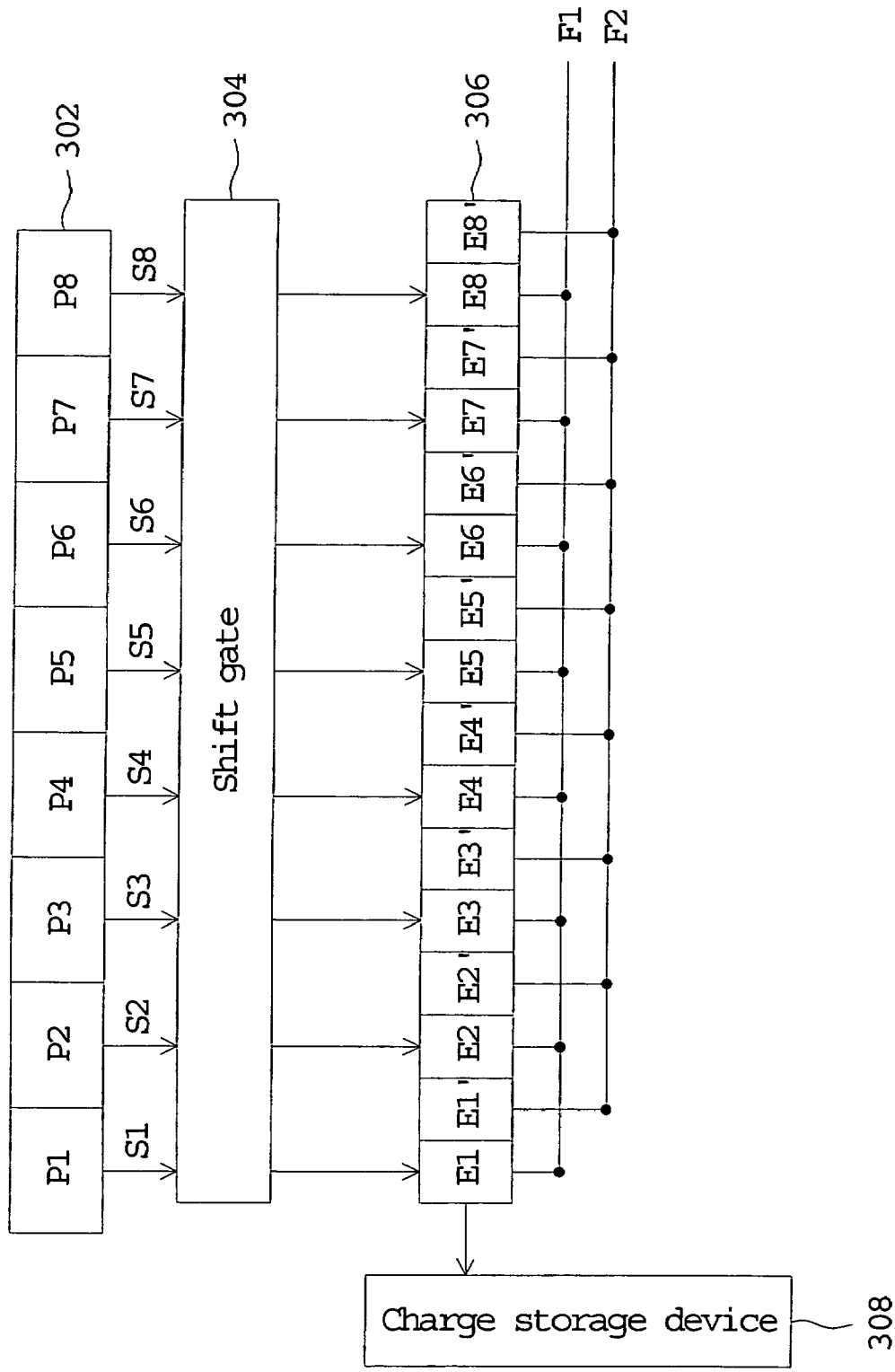
FIG. 2B is a partial schematic diagram of the image processing device.

Referring to FIG. 2B, a partial schematic diagram of the image processing device is shown. Take the combination of a scanner/multifunction peripheral and a PC as an example of the image processing device 202. The scan module 204 includes a set of photo sensors 302, a shift gate 304, a shift register 306 and a charge storage device 308. The set of photo sensors 302 is a charge coupled device (CCD) or a contact image sensor (CIS) for instance. When the image processing device 202 has an image resolution of 1200 dpi, the set of photo sensors 302 corresponding to a document in 8-inch width has totally 1200×8=9600 photo sensors P. 9600 photo sensors P are for converting the light reflected from the to-be-scanned document into charges S. In FIG. 2B, the set of photo sensors 302 includes 8 photo sensors P1~P8, for instance.

The shift register 306 outputs the charges generated in a formal scan procedure according to the frequencies of the CCD timing signal. In other words, the shift register 306 stores charges S1~S8 which is generated by the photo sensors 302 and correspond to a scan line of the to-be-scanned document, via the shift gate 304. The shift register 306 is, for example, a two-phase shift register and includes a number of register units E. The shift register 306 includes 16 register units E1~E8 and E1'~E8' in correspondence to the 8 photo sensors P1~P8 of FIG. 2B.

The CCD timing signal includes a first timing signal F1 and a second timing signal F2 whose phases are opposite. As shown in FIGS. 2A and 2B, the register units E1~E8 are controlled by the timing signal F1 and the register units E1'~E8' are controlled by the timing signal F2. When the first timing signal F1 is enabled (and the second timing signal is disabled), the register units E1~E8 respectively shift out the stored charges S1~S8. That is, the charge S1 stored in the register unit E1 is shifted out to the charge storage device 308 and the charges S2~S8 stored in the register units E2~E8 are shifted out to the register units E1'~E7' respectively. Following that, when the second timing signal F2 is enabled (and the first timing signal F1 is disabled), the register units E1'~E7' shift out the stored charges S2~S8 to the corresponding register units E1~E7. Therefore, the timing signals F1 and F2 are enabled sequentially to shift out the charges S1~S8 of the shift registers 306 to the charge storage device 308. The charge storage device 308 successively receives and registers the charges S1~S8 and outputs the charge S stored at present to the next-stage circuit (not shown in FIGS. 2A and 2B) regularly. The charges S1~S8 are processed by the next-stage circuit to obtain the required scan image.

When the image processing device 202 scans at a resolution of 1200 dpi, the scan operation is illustrated as below. When the photo sensors P1~P8 are exposed by an exposure time corresponding to 1200 dpi, the charges S1~S8 are generated by the photo sensors P1~P8. The charges S1~S8 are then transferred to the corresponding register units E1~E8 via the shift gate 304. The timing signals F1 and F2 are enabled sequentially at a constant frequency, such as a first frequency f1, so as to shift the charges S1~S8 stored in the register units E1~E8 to the charge storage device 308. The charge storage device 308 outputs a charge S regularly. That is, the charges S1~S8 are sequentially outputted at a speed corresponding to the first frequency f1 to the charge storage device 308 and the charge storage device 308 sequentially receives and registers the charges S1~S8 and outputs the charge S stored in present regularly to the next-stage circuit to obtain the 1200 dpi scan image.

When the photo sensor P of a high resolution is used to perform a 600 dpi scan operation, the scan operation is performed as below. When the photo sensors P1~P8 are exposed at an exposure time corresponding to 600 dpi, the generated charges S1~S8 are stored in the storage units E1~E8. At the time, the timing signals F1 and F2 control the charges S1~S8 to be outputted to the charge storage device 308 at a higher speed. For example, the timing signals F1 and F2 are enabled in turn at a second frequency f2, which is twice of the first frequency f1, such that the charges S1~S8 stored in the register units E1~E8 can be sequentially shifted out to the charge storage device 308 more quickly. However, the charge storage device 308 still outputs the received charge S regularly, even though the timing signals F1 and F2 have a frequency twice as large as that at the resolution of 1200 dpi. Therefore, the charges S1~S8 will be sequentially stored in the charge storage device 308 by a group of two and then be outputted to the next-stage circuit. That is, the charges S1 and S2 are in a group, the charges S3 and S4 are in a group, the charges S5 and S6 are in a group and the charges S7 and S8 are in a group. By doing this, the 600 dpi scan image can be obtained.

Furthermore, under the situation of performing a low-resolution scan operation, owing that the exposure time of the photo sensor P is shorter, the speed for moving the photo sensor P is higher. Therefore, the timing signals F1 and F2 have a higher frequency than those timing signals at a high resolution such that the charge S stored in the shift register 306 can be outputted to the charge storage device 308 more quickly. No matter how large the resolution is, the charge storage device 308 outputs the stored charges to the next-stage circuit at a constant speed. That is, scan images of different resolutions can be generated by altering the frequencies of the timing signals and the exposure time.

The invention provides a method for simultaneously capturing images of multiple areas. N areas to be scanned can be selected by using N scan windows, wherein N is an integer. N scan images corresponding to the N scan windows can be generated in one scan operation. Besides, N different resolutions at most could be set for the N scan windows. For example, when two areas to be scanned require two different resolutions, the frequency of the CCD timing signal for controlling the shift register can be adjusted, according to the resolutions respectively for each of the scan windows, to generate two scan images of two different resolutions after one single scan operation. Therefore, the inconvenience occurred for the conventional method which requires repetition of scan operation or post-editing of scan images can be largely reduced. The user can generate a number of scan images of different resolutions in one scan operation.

Figure 3:
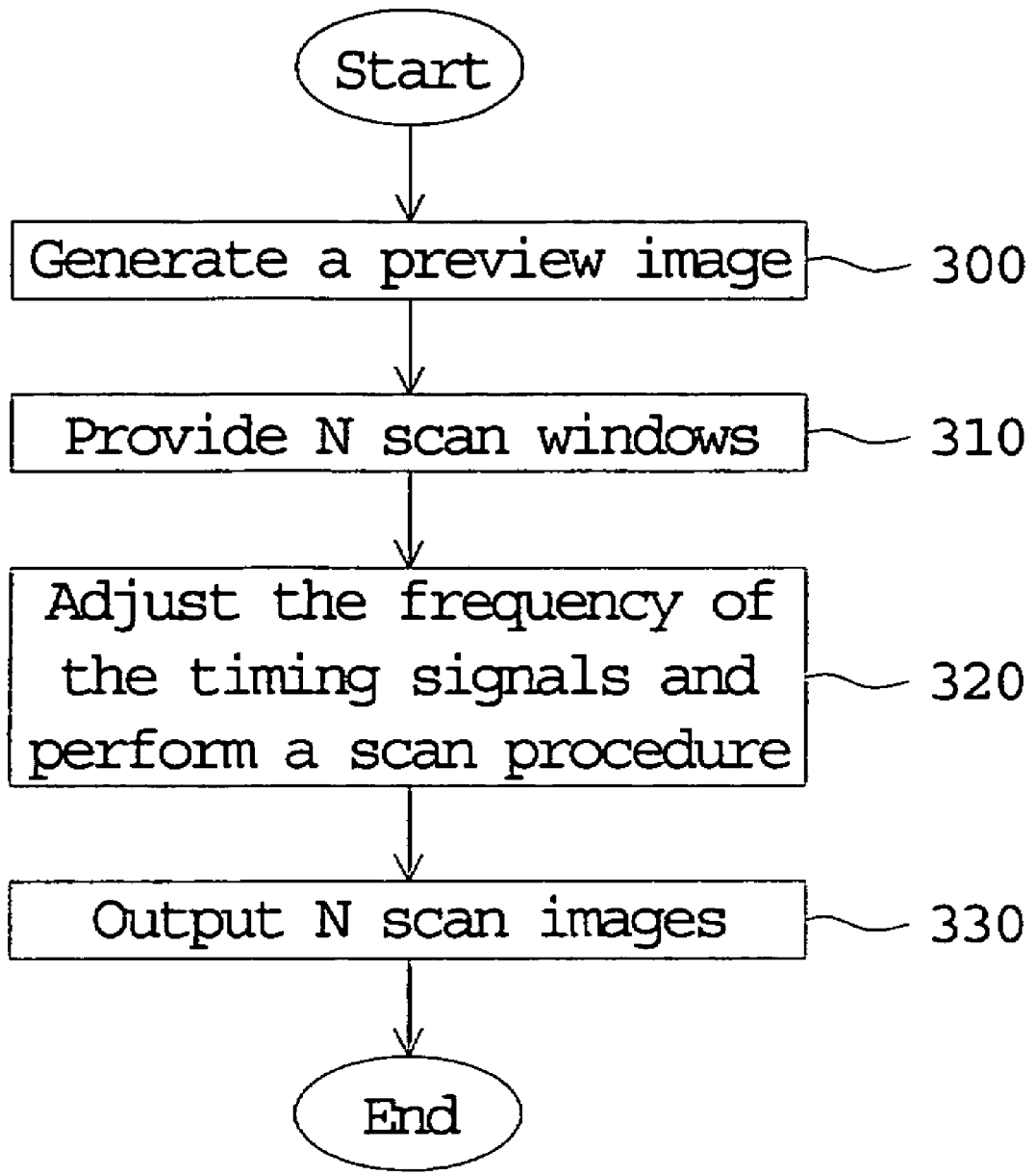
FIG. 3 is a flow chart of an image scan method according to a preferred embodiment of the invention.

Referring to FIG. 3, a flow chart of an image scan method according to a preferred embodiment of the invention is shown. The image scan method is applied to the above-mentioned image processing device 202. The image scan method includes the following steps. First, in step 300, generate a preview image of a to-be-scanned document. That is, the image processing device 202 pre-scan the entire to-be-scanned document at a lower resolution. Next, in step 310, provide N scan windows SW, wherein N is an integer. The user can select N image areas from the preview image by adjusting the size and position of the N scan windows SW. For example, when the user would like to capture images of two areas on the preview image, two scan windows SW can be used to specify the positions and the sizes of the two areas. Then, the resolutions and other image setting parameters for the scan image of the N image areas are also set. Following that, in step 320, adjust the frequency of the timing signals F1 and F2 and perform a scan procedure. That is, after the image setting parameters of the N scan windows are completely set, the image processing device 202 adjusts the frequency of the timing signals F1 and F2 in accordance with the resolutions set and performs a scan procedure. The control unit outputs a CCD timing signal of multiple frequencies. In step 330, output N scan images corresponding to the N areas specified by the N scan windows SW according to the step 320.

Figure 4:
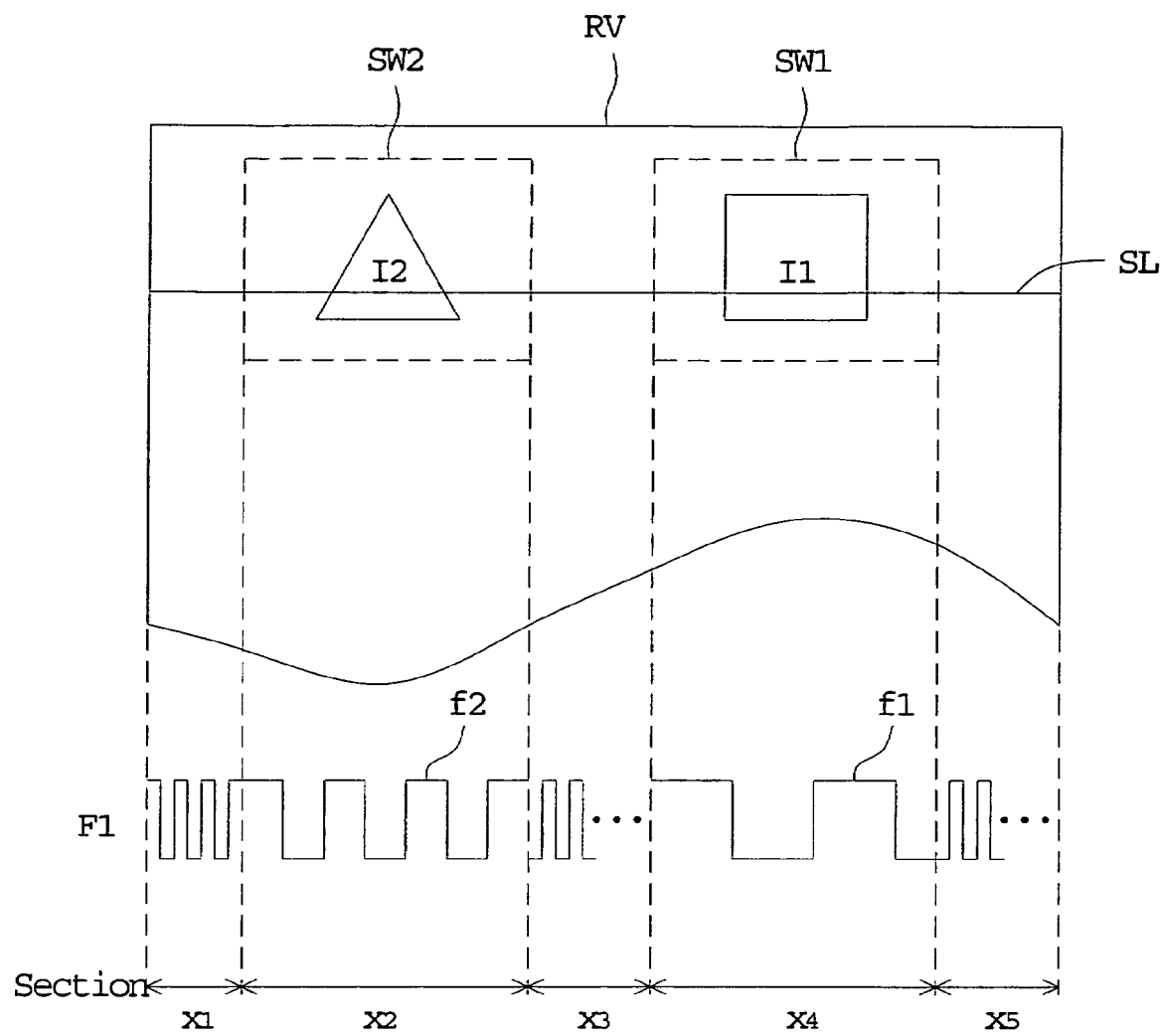
FIG. 4 is a schematic diagram of selecting two image areas from the preview image by using two scan windows.

FIG. 4 is a schematic diagram of selecting two image areas from the preview image by using two scan windows. Referring to both FIG. 3 and FIG. 4, after the preview image RV is obtained, in step 310, select image ranges 11 and 12 respectively corresponding to a first to-be-scanned area and a second to-be-scanned area from the preview image RV by using the first scan window SW1 and the second scan window SW2. Next, in step 320, after the image setting parameters are set, such as the brightness, contrast and resolution of the first scan window SW1 and second scan window SW2, proceed to scan the to-be-scanned document. The first scan window SW1 and the second scan window SW2 respectively are set to have a first resolution of 1200 dpi and a second resolution of 600 dpi, for instance.

In the scan operation, at a higher resolution (1200 dpi) the photo sensors 302 are exposed and then output charges to the shift register 306. When the shift register 306 shifts out the charges corresponding to the first scan window SW1 to the charge storage device 308, the timing signals F1 and F2 (only F1 is shown in FIG. 4) are sequentially enabled at a first frequency f1 corresponding to 1200 dpi such that the charges corresponding to the first scan window SW1 are outputted to the charge storage device 308. The charge storage device 308 outputs the charges regularly to obtain the 1200 dpi scan image.

When the shift register 306 shifts out the charges corresponding to the second scan window SW2 to the charge storage device 308, the timing signals F2 and F3 are adjusted to have a second frequency f2 such that the charges corresponding to the second scan window SW2 can be outputted to the charge storage device 308 at a higher speed. At the time, the charge storage device 308 outputs the charges regularly to obtain the 600 dpi scan image. Therefore, two scan images of different resolutions can be generated by using the two scan windows SW1 and SW2.

That is to say, as shown in FIG. 4, corresponding to a specific scan line SL, the CCD timing signal can have a number of sections having different frequencies. As shown in FIG. 4, the timing signal F1 has a frequency f2 in the second section X2 and has a frequency f1 in the fourth second X4, wherein the frequency f2 is twice as large as the frequency f1. In other sections X1, X3 and X5, the corresponding timing signals F1 and F2 have a larger frequency due to the requirement of lower resolution and thus the charges induced in a non-scan area can be outputted to the charge storage device 308 more quickly. Therefore, in the same preview image RV, when the scan windows SW1 and SW2 have different resolutions, a number of scan images with different resolutions can be obtained in a scan operation by adjusting the frequency of the timing signals F1 and F2.

In addition, the image processing device 202 can also be just a scanner or a multifunction peripheral (MFP). For example, the image processing device is a MFP. When the user is to capture two scan images from two image areas, by using the invention, two scan windows SW are used to select the image areas displayed on the display unit, such as a LCD, of the multifunction peripheral. After a scan operation, the scan images corresponding to the two image areas are generated automatically for the user. The user can directly print the scan images for instance.

According to the image scan method disclosed by the above-mentioned embodiment of the invention, the user can generate a number of scan images in one scan operation. It is not needed to waste time in repeatedly adjusting image setting parameters and scan windows for a preview image of a to-be-scanned document before a scan operation. Therefore, scan efficiency can be increased and scan cost can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for simultaneously capturing images of a plurality of areas, applied to an image processing device, the method comprising:
    scanning a document and obtaining a preview image of the document;
    providing N scan windows for selecting N to-be-scanned areas from the preview image, wherein N is an integer;
    setting N scan resolutions corresponding to the N scan windows;
    scanning the document; and
    outputting N scan images corresponding to the N scan windows according to N frequencies of a timing signal corresponding to the N scan resolutions.

2. The method according to claim 1, wherein the step of outputting N scan images corresponding to the N scan windows according to N frequencies of a timing signal corresponding to the N scan resolutions comprises steps of:
    adjusting the N frequencies of the timing signal corresponding to the N scan windows according to the N scan resolutions;
    sequentially outputting charges, generated as a result of scanning the document, from a shift register of the image processing device to a charge storage device of the image processing device according to the N frequencies of the timing signal; and
    outputting an image signal from the charge storage device regularly to generate the N scan images.

3. The image processing device according to claim 1, is a scanner.

4. The image processing device according to claim 1, is a combination of a scanner and a personal computer.

5. The image processing device according to claim 1, is a multifunction peripheral (MFP).

6. The image processing device according to claim 1, is a combination of a multifunction peripheral (MFP) and a personal computer.

7. An image processing device for simultaneously capturing images of a plurality of areas, providing a plurality of scan windows, the image processing device comprising:

a scan module, for scanning a document and generating a preview image of the document;

an operation unit, for selecting a plurality of to-be-scanned areas from the preview image by means of adjusting the positions and sizes of the scan windows, and setting a scan resolution for each of the scan window; and a control unit, electrically coupled to the scan module and the operation unit, for controlling the scan module to perform a formal scan procedure on the document according to the scan resolutions and for outputting a timing signal having a plurality of frequencies, wherein the scan module according to the frequencies of the timing signal generates a plurality of image data corresponding to the areas specified by the scan windows.

8. The image processing device according to claim 7, wherein the scan module comprises:

a shift register, for sequentially outputting charges, generated as a result of scanning the document in the formal scan procedure, according to the frequencies of the timing signal; and a charge storage device, for receiving the charges and outputting an image signal regularly to generate the image data of the areas specified by the scan windows.

9. The image processing device according to claim 7, further comprising a display unit for displaying the preview image in a preview window.

* * * * *